United States Patent [19]

Morikawa

[11] Patent Number: 4,545,347
[45] Date of Patent: Oct. 8, 1985

[54] INTAKE SYSTEM FOR AN AUTOMOTIVE ENGINE

[75] Inventor: Kouji Morikawa, Tokyo, Japan

[73] Assignee: Fuji Jukogyo Kabushiki Kaisha, Tokyo, Japan

[21] Appl. No.: 609,090

[22] Filed: May 11, 1984

[30] Foreign Application Priority Data

May 12, 1983 [JP] Japan ................................. 58-83183

[51] Int. Cl.⁴ ............................................ F02M 35/10
[52] U.S. Cl. ..................................... 123/308; 123/336
[58] Field of Search ............... 123/52 M, 52 MC, 308, 123/432, 336, 442, 568, 572, 579, 584

[56] References Cited

U.S. PATENT DOCUMENTS

| | | | |
|---|---|---|---|
| 4,196,701 | 4/1980 | Tamura et al. ....................... | 123/308 |
| 4,231,339 | 11/1980 | Matsumoto et al. ............ | 123/308 X |
| 4,271,801 | 6/1981 | Yamakawa et al. ............ | 123/308 X |
| 4,449,505 | 5/1984 | Tezuka et al. ....................... | 123/432 |

FOREIGN PATENT DOCUMENTS

| | | | |
|---|---|---|---|
| 0144516 | 11/1979 | Japan ..................................... | 123/572 |
| 0050132 | 11/1981 | Japan . | |
| 0102517 | 6/1982 | Japan ..................................... | 123/308 |

Primary Examiner—Parshotam S. Lall
Assistant Examiner—W. R. Wolfe
Attorney, Agent, or Firm—Martin A. Farber

[57] ABSTRACT

An intake system for an automotive engine having cylinders, primary intake ports communicated with the cylinders, and secondary intake ports communicated with the cylinders. Each of the primary and secondary intake ports is communicated with a corresponding cylinder at a common intake valve. A primary intake manifold communicated with the primary intake ports and a secondary intake manifold communicated with the secondary intake ports are provided. A control valve is provided in each branch of the secondary intake manifold for controlling a counter flow of induced mixture. A vacuum operated actuator opens the control valve in dependency on an increase of engine speed and load on the engine.

2 Claims, 3 Drawing Figures

INTAKE SYSTEM FOR AN AUTOMOTIVE ENGINE

BACKGROUND OF THE INVENTION

The present invention relates to an intake system for an internal combustion engine having primary and secondary intake systems each having a carburetor, in which the primary intake system operates for light load and the secondary intake system operates for heavy load.

In order to improve combustion efficiency, a turbulence-generating port for providing a swirl effect is known. The turbulence-generating port is curved so as to admit air-fuel mixture in a tangential direction. However, such a curved port increases the resistance in the port.

As a method for improving the output at heavy load in addition to the swirl effect, Japanese Utility Model Publication 56-50132 discloses an intake system for an automotive engine comprising a first intake system for light and partial loads and a second intake system for heavy load. Each intake system has an intake passage having a carburetor and an intake port separated from the intake port for the other intake passage. At light and partial load, mixture is admitted into a corresponding cylinder through the first intake system, and at heavy load, mixture is admitted through both systems. The intake port of the first intake passage is reduced in cross sectional area for increasing the velocity of the mixture and disposed in a tangential direction to provide a swirl effect.

In such a system, the swirl effect or swirl force is constant during light and partial load operations, because the sectional area of the intake port is not changed in accordance with load on the engine. By the way, it is desirable that swirl effect varies with the load on the engine and with engine speed in order to provide optimum combustion efficiency. Since combustion is not efficiently conducted at low engine speed and light load, high swirl effect is required. In other words, it is desirable to increase the swirl effect as engine speed and load decrease.

SUMMARY OF THE INVENTION

The object of the present invention is to provide a system which may meet the above described requirements for swirl effect and provide optimum swirl effect dependent on operating conditions of an engine.

To this end, according to the present invention, there is provided an intake system for an automotive engine having cylinders, primary intake ports communicated with the cylinders, and secondary intake ports communicated with the cylinders. Each of the primary and secondary intake ports is communicated with a corresponding cylinder at a common intake valve, and each primary intake port is disposed in a tangential direction so as to provide a swirl of induced mixture. A primary intake manifold communicated with the primary intake ports and a secondary intake manifold communicated with the secondary intake ports are provided.

A primary carburetor having a throttle valve is provided in the primary intake manifold, and a secondary carburetor having a throttle valve is provided in the secondary intake manifold. The throttle valve of the secondary carburetor is so arranged to be opened after the throttle valve of the primary carburetor has been fully opened.

A control valve is provided in each branch of the secondary intake manifold for controlling a counter flow of the induced mixture. A vacuum operated actuator is provided for opening the control valve as engine speed increases. A sensor senses engine speed and load on the engine, and a control circuit responsive to the outputs of the sensor operates the actuator so as to open the control valve as engine speed and load increase.

The other objects and features of this invention will be apparently understood from the following description with reference to the accompanying drawings.

DETAILED DESCRIPTION OF THE PREFERRED EMBODIMENT

Figure 1:
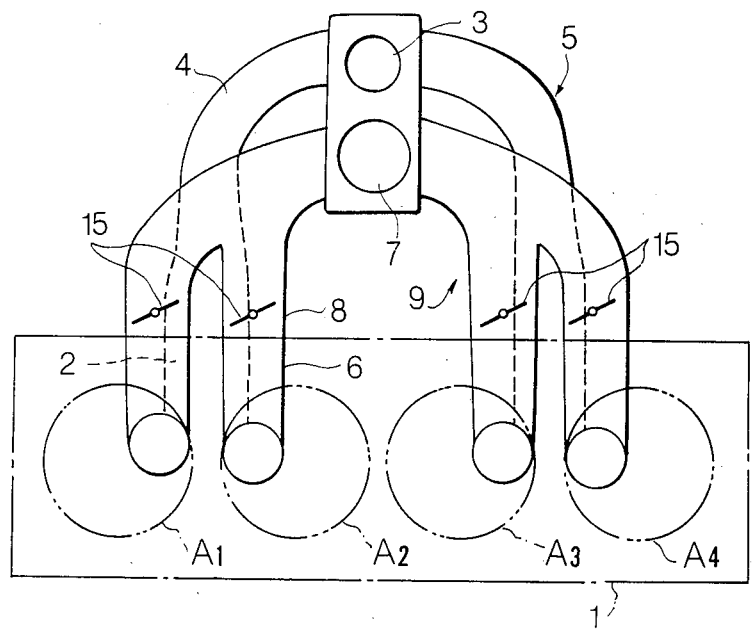
FIG. 1 is a schematic view showing an embodiment of the present invention.
Figure 2:
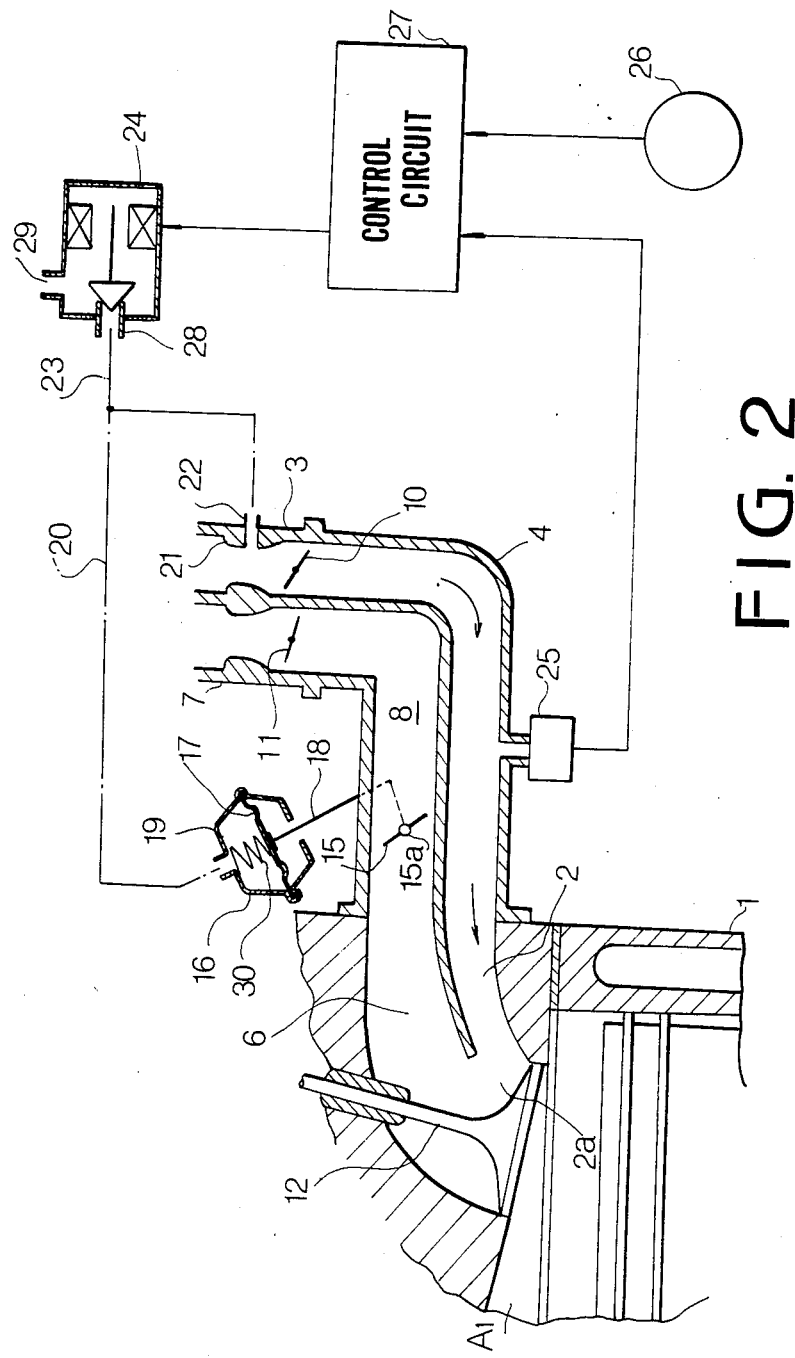
FIG. 2 is a sectional view showing a part of an intake system of an engine according to the present invention and showing a control system associated with the engine.

Referring to FIGS. 1 and 2, an engine 1 is a four-cylinder engine comprising Nos. 1 and 2 cylinders $A_1$ and $A_2$ Nos. 3 and 4 cylinders $A_3$ and $A_4$, respectively. A bifurcated primary intake port 2 is communicated with the cylinders $A_1$ and $A_2$ and another primary intake port 2 is communicated with the cylinders $A_3$ and $A_4$. Secondary intake ports 6 are provided adjacent the primary intake ports 2 to communicate respective cylinders. Adjacent primary and secondary intake ports are communicated with each other at a position adjacent to a common intake valve 12. The sectional area of each primary intake port at the outlet 2a is reduced and the primary intake port is disposed in a tangential direction to provide a swirl of the induced mixture.

Primary intake ports 2 are communicated with a primary intake manifold 4 having a primary carburetor 3 to form a primary intake system 5. Secondary intake ports 6 are connected to a secondary intake manifold 8 having a secondary carburetor 7 to form a secondary intake system 9. Throttle valves 10 and 11 of primary and secondary carburetors 3 and 7 are operatively connected with each other such that when an accelerator pedal is further depressed after the throttle valve 10 has been fully opened, the throttle valve 11 starts to open. That is, the throttle valve 10 is opened at light and partial load and the throttle valve 11 is opened at heavy load.

Since the primary intake port 2 and the secondary intake port 6 communicate with each other at the outlet 2a, a part of the mixture induced by the intake stroke of No. 1 cylinder $A_1$, for example, flows in the left-hand branch of intake manifold 4 (FIG. 1), primary intake port 2 for No. 2 cylinder $A_2$, intercommunicating portion of intake ports 2 and 6, intake port 6, intake manifold 8, and intake port 6, and enters into the cylinder $A_1$. The addition of the mixture induced passing through the other branch of the manifold causes the reduction of the swirl effect.

In the system of the present invention, the swirl effect is controlled by controlling the counter flow of the induced mixture. A control valve 15 comprising a throttle plate is rotatably supported by a shaft 15a in each branch of the secondary intake manifolds 8. The shaft 15a is connected to a link 18 of a vacuum operated actuator 16. The vacuum operated actuator comprises a vacuum chamber 19 defined by a diaphragm 17 which is connected to the link 18. The vacuum chamber 19 is communicated with the primary intake manifold 4 so as to be applied with vacuum at light and partial load on the engine. In the illustrated embodiment, the vacuum chamber is communicated with the primary carburetor 3 at a port 22 formed in a venturi 21 by a passage 20. A leak passage 23 is communicated with the passage 20 and with a port 28 of a solenoid operated valve 24. On the other hand, a boost sensor 25 is provided to sense the boost pressure in the primary manifold 4. In addition, an engine speed sensor 26 is provided. Outputs of both sensors 25 and 26 are applied to a control circuit 27 to control the operation of the solenoid operated valve 24 in such a manner as to intermittently excite the solenoid by pulses.

Figure 3:
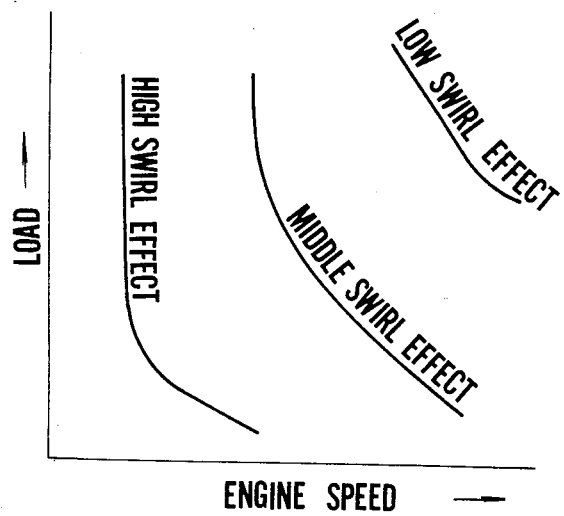
FIG. 3 is a graph showing variation of swirl effect according to engine speed and load.

The control circuit 27 comprises a microcomputer which stores a map for the swirl effect which varies with engine speed and load as shown in FIG. 3 so as to produce a control signal to provide optimum swirl effect. As seen from FIG. 3, the swirl effect decreases with an increase of engine speed and with a decrease of load.

In operation, the throttle valve 10 of the primary carburetor 3 opens at light load. Air-fuel mixture produced by the carburetor flows in the intake manifold 4 and intake ports 2 and enters cylinders $A_1$ to $A_4$. Since the valves 15 close the intake manifold 8 at light load, the mixture is supplied only from the primary intake ports 2 each having a small sectional area. Accordingly, a sufficient swirl effect can be provided.

At partial load, as the amount of intake air increases, the vacuum at the venturi 21 of the carburetor 3 increases so as to deflect the diaphragm 17 to open the valve 15.

On the other hand, the outputs of the boost sensor 25 and engine speed sensor 26 are applied to the control circuit 27. The control circuit produces pulses, the duty ratio of which varies in dependence on the outputs of both sensors. At low engine speed and light load, the control circuit 27 produces pulses having a high duty ratio which provide a long duration of opening of the solenoid operated valve 24. Accordingly, a large amount of air leaks from the passage 20 to the atmosphere through passage 23, ports 28 and 29. Thus, the vacuum chamber 19 is applied with a low vacuum, so that the diaphragm 17 is deflected by a spring 30 to close the control valve 15. Accordingly, counter flow of mixture is prevented by the valve 15 and mixture is induced into the cylinders passing only the primary intake manifolds 4, so that a high swirl effect can be obtained. As the engine speed and load increase, the duty ratio of the pulses generated from the control circuit decreases, so that the amount of leak air from the solenoid operated valve 24 decreases. Accordingly, the vacuum applied to the vacuum chamber 19 rises to deflect the diaphragm 17 against the spring 30 to rotate the control valve 15. Thus, the amount of counter flow of the induced mixture increases, so that the swirl effect is decreased by the induced mixture passing through the secondary intake manifold 8.

At heavy load, the throttle valve 11 of the secondary carburetor 7 opens and the control valve 15 is fully opened. In addition to the mixture through the primary intake system, the mixture through the secondary intake system is induced into the cylinders thereby further decreasing the swirl effect and producing sufficient power with a large amount of mixture.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An intake system for an automotive engine having cylinders, comprising:

primary intake ports communicated with said cylinders;

secondary intake ports communicated with said cylinders;

each of said primary and secondary intake ports being communicated with a corresponding cylinder at a common intake valve;

each primary intake port being disposed in a tangential direction so as to provide a swirl of induced mixture;

a primary intake manifold communicated with said primary intake ports;

a secondary intake manifold communicated with said secondary intake ports;

a primary carburetor having a throttle valve provided in said primary intake manifold;

a secondary carburetor having a throttle valve provided in said secondary intake manifold;

said throttle valve of the secondary carburetor being so arranged to be opened after the throttle valve of the primary carburetor has been fully opened;

a control valve provided in each branch of said secondary intake manifold for controlling a counter flow of inducted mixture;

means for opening said control valve in dependence on increase of engine speed, and wherein said means comprises actuating means for actuating said control valve, sensing means for sensing engine speed and load on the engine, control circuit means responsive to outputs of said sensing means for operating said actuating means so as to open said control valve as engine speed and load increase.

2. The intake system for an automotive engine according to claim 1 wherein said actuating means comprises a vacuum operated actuator operated by vacuum in the primary intake manifold and a solenoid operated valve for controlling the vacuum applied to said actuator.

* * * * *